United States Patent
Hague et al.

[15] 3,678,801
[45] July 25, 1972

[54] QUICK TOOL CHANGE MECHANISM FOR MACHINE TOOLS

[72] Inventors: Robert Z. Hague, Oradell; Howard H. Laucks, S. Hackensack; Alfred J. Mastropole, Saddle River, all of N.J.

[73] Assignee: Moog, Inc., East Aurora, N.Y.

[22] Filed: March 16, 1970

[21] Appl. No.: 19,703

[52] U.S. Cl. ............................................. 90/11 D, 408/239
[51] Int. Cl. .................................................. B23c 5/26
[58] Field of Search .................... 90/11 A, 11 D; 408/239

[56] References Cited
UNITED STATES PATENTS 2,860,547  11/1958  Stephan .............................. 90/11 A
3,023,675  2/1962  Stephan .............................. 90/11 A Primary Examiner—Francis S. Husar
Attorney—Sommer, Weber & Gastel

[57] ABSTRACT

A selectively operable mechanism is provided for manually changing quickly tool holders on the spindle of a machine tool. The operator uses one hand to grasp the tool holder at the spindle, either the one being removed or a replacement, and with his other hand operates a control to effect either a release from or securement to the spindle of the tool holder.

17 Claims, 15 Drawing Figures

INVENTORS
ROBERT Z. HAGUE
HOWARD H. LAUCKS
ALFRED J. MASTROPOLE
BY Sommer, Weber & Gastel
ATTORNEYS

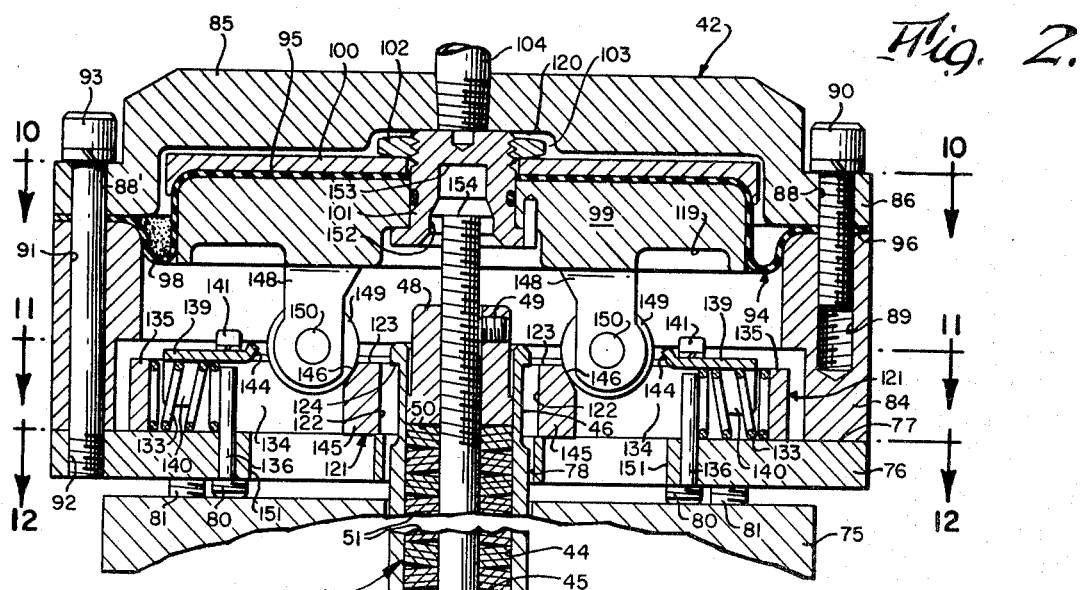
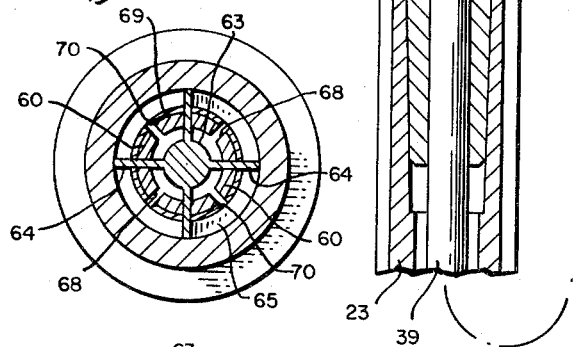
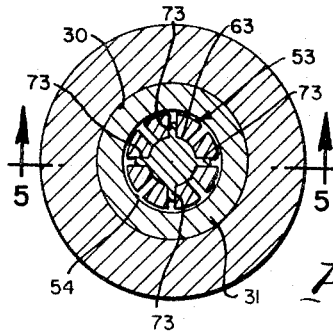
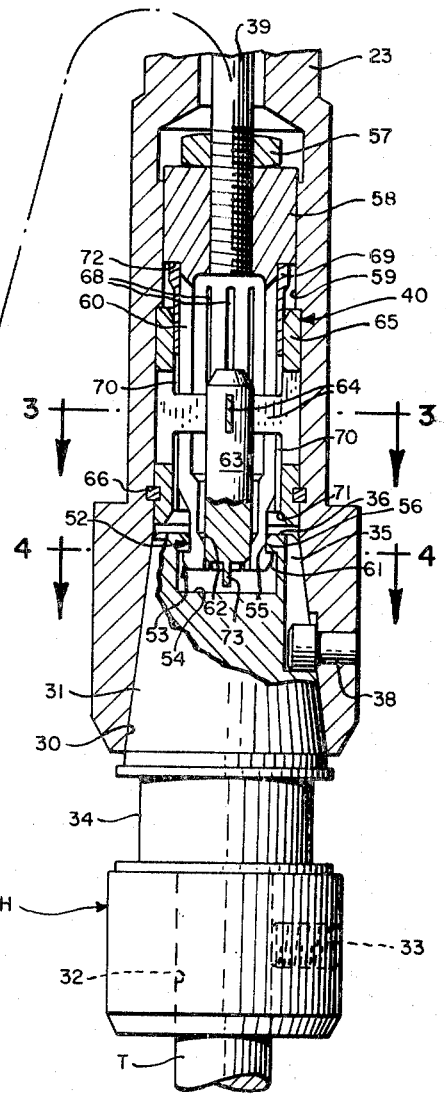

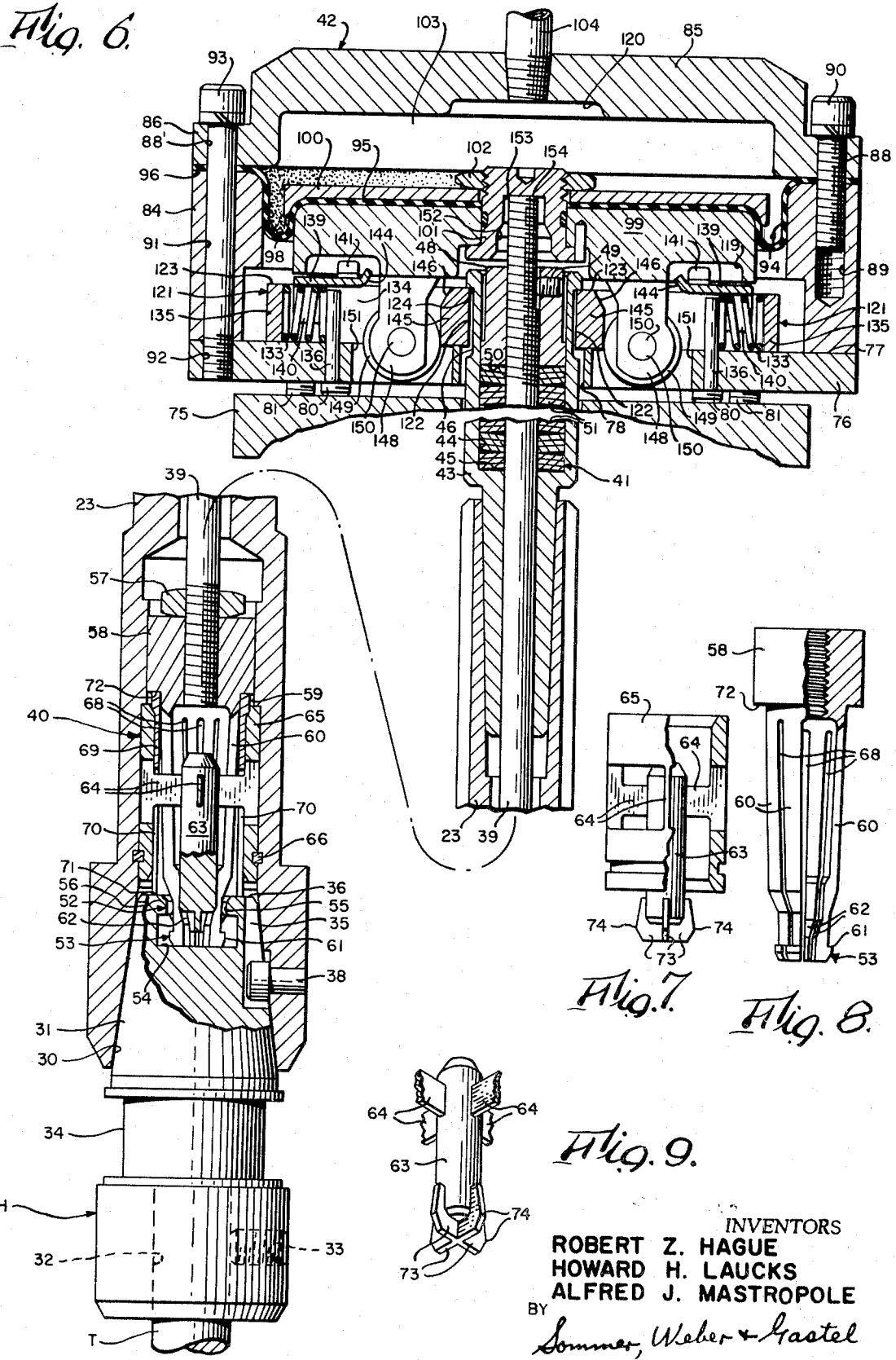

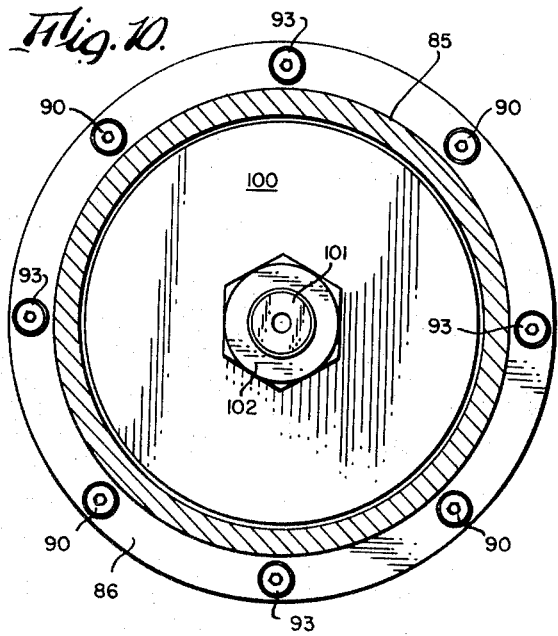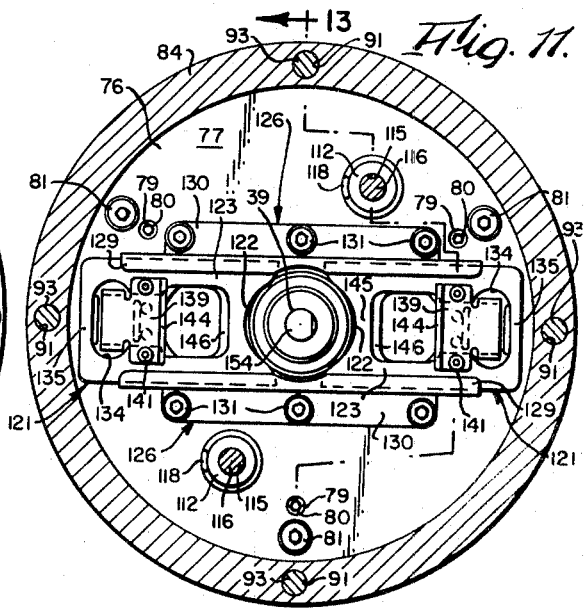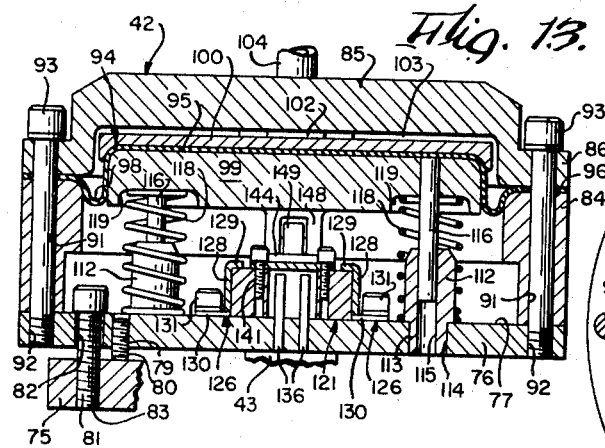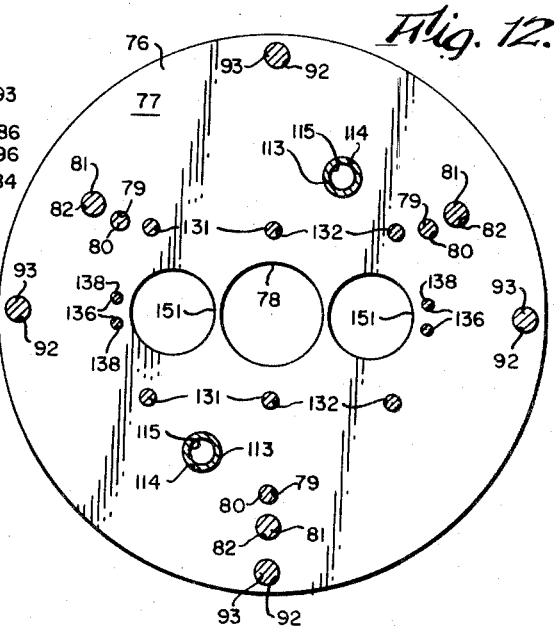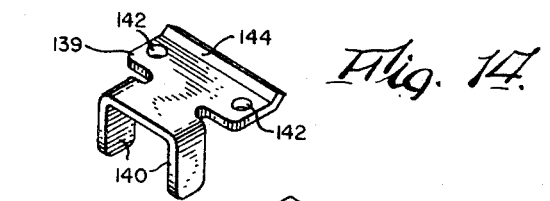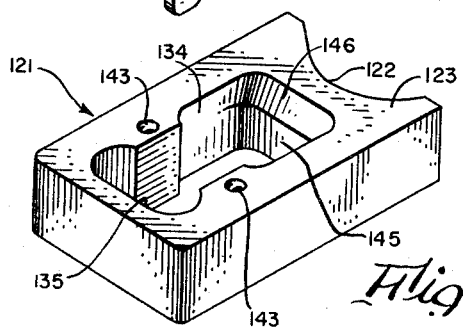

QUICK TOOL CHANGE MECHANISM FOR MACHINE TOOLS

BACKGROUND OF THE INVENTION

While automatic tool changers are known, it is not always desirable nor feasible to equip a machine tool with such a changer. Rather, in some situations, it is desirable to provide a non-automatic or manually operated mechanism for changing tools on the spindle of the machine tool. The actual metal working tool or bit portion which cuts the metal is usually securely mounted in a holder which in turn is mounted on the spindle. As used herein and in the appended claims, tool holder is intended to mean such a cutting tool per se of one or more pieces, whether or not mounted on a separate part to adapt it for mounting on the spindle.

SUMMARY OF THE INVENTION

The present invention relates to a tool changer mechanism for machine tools which is manually operated. The operator uses one hand to hold the tool holder, either the one to be removed or another to be mounted on the machine tool spindle, and uses his other hand to operate a control. This control is arranged either to release and eject a tool holder intended to be removed from the spindle, or after positioning a substitute tool holder in the recess of the spindle will firmly secure such substitute tool holder to the spindle.

The advantages of such a tool change mechanism embodying the present invention are that it is quick and easy to operate, requires the use of no wrench or the like to mount or remove a tool holder on the spindle, is relatively simple in construction and inexpensive to manufacture considering its function, and is not likely to get out of order or require repairs. Moreover, its construction is such as to adapt it for incorporation in standard machine tools without requiring excessive modification thereof, and therefore the tool change mechanism is particularly suitable for retrofitting.

Other advantages and objects of the invention will be apparent from the following detailed description of a preferred embodiment of the present invention illustrated in the accompanying drawings.

BRIEF DESCRIPTION OF THE DRAWINGS

FIG. 2 is a fragmentary enlarged vertical central sectional view of the spindle and associated tool change mechanism shown in FIG. 1, taken on line 2—2 thereof, and illustrating the tool holder connected to the spindle.

FIG. 3 is a horizontal sectional view of the spindle taken on line 3—3, FIG. 2.

FIG. 4 is a horizontal sectional view of the spindle taken on line 4—4, FIG. 2.

FIG. 5 is a fragmentary view similar to a portion of the means for connecting the spindle to a tool holder shown in section in FIG. 2, but showing the same in elevation.

FIG. 6 is a view similar to FIG. 2 but illustrating the tool change mechanism in a different condition specifically with the tool holder disconnected from the spindle.

FIG. 7 is an elevational view of a slide and cam member, with a portion broken away, forming a component of the means for connecting the tool holder to the spindle.

FIG. 8 is an elevational view of a spindle hook member, with a portion broken away, forming another component of the means for connecting the tool holder to the spindle.

FIG. 9 is a fragmentary perspective view of the cam portion of the member shown in FIG. 7 and illustrating the guide spider arranged thereon.

FIG. 10 is a horizontal sectional view of the actuator assembly of the tool change mechanism, taken on line 10—10, FIG. 2.

FIG. 11 is another horizontal sectional view thereof taken on line 11—11, FIG. 2.

FIG. 12 is still another horizontal sectional view thereof taken on line 12—12, FIG. 2.

FIG. 13 is a fragmentary vertical sectional view thereof taken on line 13—13, FIG. 11.

FIG. 14 is a perspective view of a ramp member shown in FIGS. 2 and 11 for providing a slide-retract cam surface.

FIG. 15 is a perspective view of one of the slide members shown in FIGS. 2 and 11 and on which the ramp member of FIG. 14 is mounted.

DESCRIPTION OF THE PREFERRED EMBODIMENT

Figure 1:
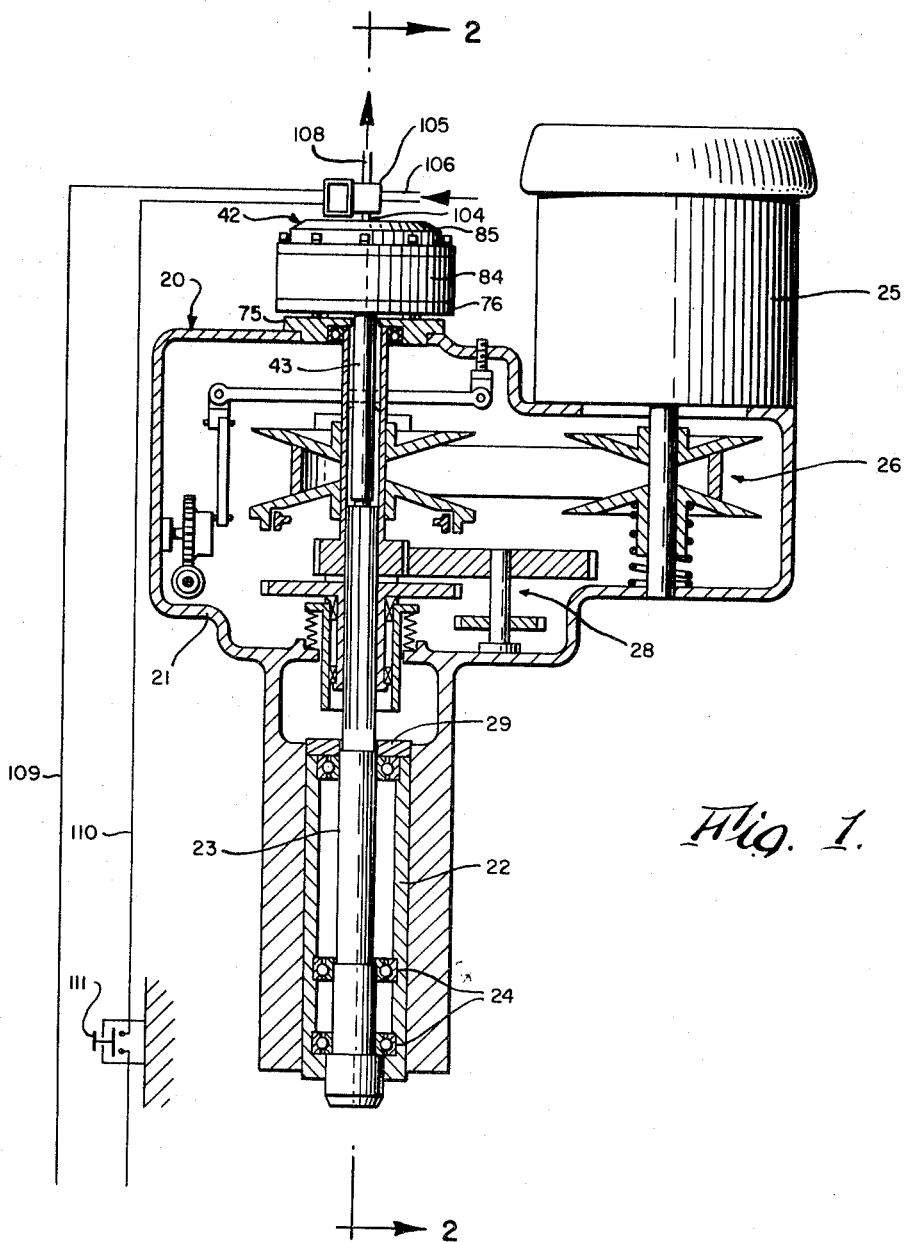
FIG. 1 is a fragmentary vertical sectional view of the head structure of a vertical spindle milling machine equipped with a tool change mechanism embodying the present invention.

The numeral 20 represents a head structure of a machine tool of any suitable type, illustrated specifically as a vertical milling machine, this head structure overhanging a knee portion (not shown) of the machine. This head structure includes a housing 21 on which a quill 22 is suitably supported for vertical but non-rotative movement. This quill suitably supports a vertically disposed spindle 23 which is constrained to move vertically with the quill but is free to rotate relative thereto, bearings indicated at 24 being provided for so journaling the spindle. The lower end of the spindle is shown as exposed from the head structure and is adapted to be drivingly connected as will be described infra to any one of a plurality tool holders, typically represented by H.

Spindle 23 is suitably driven at a selectively variable rotational speed by an electric drive motor 25 through an adjustable belt and pulley assembly 26 and a shiftable back gear assembly 28. Each of these assemblies is well known to those skilled in the machine tool art, form no part of the tool change mechanism of the present invention and hence are not described herein.

The vertical axis along which quill 22 together with spindle 23 are movable is regarded as the Z-Z axis of the machine tool. The means for so vertically moving the quill and spindle form no part of the present invention and may be of any suitable construction. However, it is preferred to use the hydraulic means disclosed in U.S. Pat. No. 3,420,141. With an arrangement such as disclosed in such patent, the quill and spindle are caused to move vertically by a hydraulic drive on a cross bar suggested at 29 in FIG. 1.

Spindle 23 and a tool holder H must be adapted for connection to each other whereby the tool holder is firmly secured to the spindle. For this purpose and as shown in FIGS. 2 and 6 the spindle is tubular and has at its lower end an internally tapered tool-receiving section or recess 30. Each tool holder for use on such spindle has an externally tapered spindle-insertable end portion 31 adapted to be inserted into and seated on the wall of the tapered recess 30.

Tool end portion 31 is shown as being formed on an adapter herein referred to as a tool holder which is separate from the bit end of the tool T per se. This is desired so that conventional metal working tools can be adapted for mounting on spindle 23. The upper end of tool bit T is shown arranged in an axial recess 32 provided in the bottom of holder H and non-rotatively secured thereto by a radial set screw 33.

The tool holder H is shown as having an annular groove 34 which enables it to be used in connection with a known form of automatic tool changer, if desired.

Means are provided for indexing tool holder H relative to spindle 23 so as to orient these elements angularly relative to each other and also to lock the two elements together against relative rotation, such means being shown as including a longitudinally extending groove or keyway 35 which extends to the upper end face 36 of holder H and a radial key 38 carried by the spindle. Key 38 specifically is shown as a pin pressed into a recess in the sidewall of the spindle and having a head projecting inwardly of the tapered section and received in keyway 35.

In accordance with the present invention, a quick tool change mechanism is provided which comprises a drawbar 39; means indicated generally at 40 for releasably connecting the drawbar to a tool holder H responsive to longitudinal movement of the drawbar relative to spindle 23; and means for controlling the movement of the drawbar for moving the same relative to the spindle, including bias means indicated generally at 41 operatively arranged between the drawbar and spindle 23 and urging the drawbar to move relative to the spindle in one direction to pull the tool holder into seated engagement in recess 30 and release means indicated generally at 42 for moving the drawbar relative to the spindle in the opposite direction to operate the holder-to-drawbar connection means to disconnect the holder from the drawbar.

Spindle 23 at its upper end is shown as being internally tapered to receive the externally tapered lower end of a tubular spindle extension 43 the upper portion of which is formed with a pocket 44 leaving an upwardly facing shoulder 45. Adjacent its upper end the exterior of this extension 43 is provided with an annular groove 46. Drawbar 39 is a rod-like member externally threaded at opposite ends which extends through the tubular spindle 23, through the tubular spindle extension 43 and through the pocket 44. Adjacent its upper end the drawbar carries a nut 48 screwed on the external threads of the drawbar, this nut being held against rotation on the drawbar in the desired adjusted position by a radial set screw 49. The lower surface 50 of this nut provides a shoulder which faces downwardly opposed to shoulder 45.

Bias means 41 are arranged in pocket 44 between shoulders 45 and 50. As shown such means comprise a plurality of sets of Belleville spring washers individually indicated at 51 and surrounding drawbar 39. Each set is shown as comprising three nested washers 51 with the dished sides of one set being inverted with respect to the nested washers in the adjacent set. A sufficient number of sets of such spring washers 51 is provided to produce the desired loading on drawbar 39. Thirty-four sets of washers 51 are typical for the actual mechanism. It will be seen that with the stack of springs 51 compressed when the lower end of drawbar 39 is connected to a tool holder H seated in recess 30 an upward force is exerted on this tool holder.

Turning now to the construction of the holder-to-drawbar connection means 40 at the lower end of the drawbar, such means are shown as comprising generally a tool hook 52 and a spindle hook 53. The tool hook is formed as a recess 54 in end face 36. This hook recess has a reduced mouth or entrance 55 which is formed by an inturned annular lip 56 to provide the tool hook. The spindle hook is provided by a slide member 58 threadedly connected to the lower end of drawbar 39 and arranged in a cylindrical bore section 59 in the spindle and includes a plurality of circumferentially spaced fingers 60 severally projecting axially from slide member 58. The free end of each of these fingers 60 is radially movable and formed to provide an external hook 61. All such external hooks 61 collectively provide spindle hook 53 which is radially expandable and contractable. A jam nut 57 on drawbar 39 bears against the upper end face of slide member 58 to prevent unintentional separation of the parts.

The spindle hook when contracted by axial movement of slide member 58 in a downward direction relative to the spindle is insertable through mouth 55 past lip 56 into recess 54 upon insertion of tool holder H into spindle recess 30. When in a relative axial position of the tool hook and spindle hook being overlapped, the spindle hook is expanded by cam means into locked engagement with the tool hook. Such cam means for causing in and out radial movement of fingers 60 include cam surfaces 62 severally on the radially inner side of these fingers at their free ends, and a cylindrical cam 63 mounted on the spindle within the cluster of fingers and engageable with cam surfaces 62. Cylindrical cam 63 is shown as mounted in its central position by a plurality of fin-like radial struts 64 severally extending through the spaces 68 between adjacent pairs of fingers 60. Four such radial struts are shown which at the inner ends are connected to cylindrical cam 63 and at their outer ends to a cylindrical sleeve 65 which is suitably held stationary within the spindle bore 59 as by the retainer ring 66. Inasmuch as eight fingers 60 are shown there are eight spaces 68 between adjacent pairs of fingers, alternate ones of such spaces being occupied by the struts 64.

Means are provided for ejecting the tool holder H which is arranged on spindle following disengagement of the spindle and tool hooks. Such tool ejection means are shown as being responsive to axial movement of slide member 58 in a downward direction. More specifically, such tool ejection means includes a sleeve member 69 arranged within and slidable on sleeve 65 and having axially extending slots 70 which receive severally struts 64. The lower end 71 of this sleeve member is adapted to engage and bear against tool end face 36 when pushed thereagainst by a downwardly facing shoulder 72 on sleeve 58 engaging the upper end face of this ejector sleeve member.

In order to prevent unintended reengagement or snagging of the tool hook 52 and spindle hook 53 upon lowering of tool holder H relative to spindle 23, the separation between tapered surfaces 30 and 31 permitting some lateral movement which might cause such hooking, a guide spider is provided on the lower end of cylindrical cam 63. This guide spider includes a plurality of radial fins 73 suitably formed on the extreme lower end of cam 63 and extending downwardly therebelow. The radially outer edges or guide surfaces of these fins are peaked as indicated at 74 to have collectively a diameter which is slightly less than the diameter of the mouth 55 to hook recess 54 or about the external diameter of the tool hook 53 when contracted. These peaks or salients 74 being above the hook surfaces of tool hook 53 are exposed radially outwardly thereof when the tool hook is contracted and are adapted to rub along the wall surface of the recess mouth 55 in tool holder H in order to guide withdrawal of the tool hook through this mouth. Thus as the tool holder lowers relative to the spindle, leaving the recess therein, the salients 74 of the spider fins 73 will be adapted to engage the edge of the inturned lip 56 in order to guide the tool holder more or less centrally with respect to the spindle as it leaves the spindle.

The means to generate the force for moving drawbar 39 and spindle hook 53 upwardly comprise the springs 51. In this connection it is to be noted that with tool holder H seated on spindle 23 as depicted in FIG. 2 springs 51 are partially compressed thereby to firmly snug up the tool holder in the spindle taper. Since this spring force is contained within the spindle, no forces are applied to spindle bearings 24.

The means for moving drawbar 39 in a downward direction so as to effect disengagement between spindle hook 53 and tool hook 52 comprise the release means 42. Referring to FIGS. 1, 2 and 6, the numeral 75 represents a bearing cap of head structure 20 of the machine tool. Supported slightly above this bearing cap is a mounting plate 76 of circular outline having a flat upper surface 77. This plate is provided with a central enlarged opening 78 through which spindle extension 43 extends. At circumferentially spaced intervals, plate 76 is provided with three internally threaded vertical holes 79 in each of which is screwed a set screw 80. These set screws extend downwardly below the lower surface of plate 79 and their lower ends bear against the top surface of bearing cap 75. By adjusting these screws relative to the plate, this plate can be leveled and placed at the desired elevation relative to the bearing cap. When level, plate 76 can be firmly secured in position to the bearing cap by a plurality of cap screws 81, three being shown, each arranged in one of three circumferentially spaced holes 82 provided in this plate, the threaded lower ends of these screws being received in internally threaded recesses 83 provided in the bearing cap as shown in FIG. 13.

Arranged on top of mounting plate 76 is a tubular cylindrical housing 84, in turn covered by an end cap 85. This end cap is shown as having an out-turned annular attaching flange 86 provided with a series of eight vertical holes 88 spaced at equal circumferential intervals. Vertically aligned with alternate ones of these holes 88 are four internally threaded blind holes 89. A cap screw 90 is screwed into each of holes 89, extending through the corresponding vertically aligned hole 88 in flange 86. Through holes 91 are provided for the remaining four holes 88 and are vertically aligned therewith. At their lower ends these holes 91 align with internally threaded holes 92 provided in plate 76. Cap screws 93 are arranged in the aligned holes 88', 91 and 92 screwed into holes 92.

A diaphragm 94 is provided having a central portion 95, a marginal portion 96 and an intermediate free or unrestricted, slightly folded but flexible portion 98. The marginal portion 96 is sealingly clamped between end cap flange 86 and the upper surface of housing 84. The central portion 95 is sealingly clamped between the upper horizontal surface of a vertically movable piston 99 and a clamp plate 100, the assembly being held together by a bolt 101 and nut 102. Bolt 101 extends upwardly through aligned holes centrally provided in piston 99, diaphragm 94 and plate 100, and nut 102 bears against the upper surface of this plate. The space above the diaphragm 94 with its covering plate 100 and below end cap 85 provides an actuator chamber 103 into which pressurized fluid is admitted via an inlet conduit 104 arranged in the upper central part of end cap 85.

Referring to FIG. 1, conduit 104 is associated with a two-way solenoid valve 105 one port of which is connected to a supply conduit 106 for pressurized fluid connected to any suitable source (not shown), preferably compressed air at a typical pressure of about 85 pounds per square inch. The other port 108 is connected to atmosphere to serve as an exhaust port. Associated with solenoid valve are two electrical lines 109 and 110 in one of which is provided a normally open electrical push button switch 111. This switch is arranged in any convenient location, preferably so that it can be contacted by one hand of the operator while his other hand can grasp a tool holder H while mounted in spindle 23. When the switch is open, as shown, solenoid valve is deenergized so that conduit 104 connects with exhaust port 108. However, when the switch is closed, the solenoid valve is energized so as to establish communication between supply conduit 106 and conduit 104 and thereby introduce compressed air into actuator chamber 103.

Piston 99 is guided for vertical movement. The means for providing this are shown as comprising a tubular piston guide 112 having a reduced lower end portion 113 arranged in a hole 114 in mounting plate 76. Two such piston guides are provided on diametrically opposite sides of central hole 78 in this plate. Each guide 112 has a vertical bore 115 to slidably receive a vertical guide rod 116 carried by and depending from piston 99. Surrounding each corresponding piston guide and rod is a piston return spring 118 shown as a helical compression spring. The lower end of this spring bears against the upper surface 77 of plate 76 and the upper end of the spring bears against the bottom of a spring-centering shallow recess 119 provided in the lower surface of piston 99. Engagement of the upper end surface of piston guide 112 with the bottom of each recess 119 limits the downward travel of the piston. The upper travel of the piston is limited by the end of bolt 101 bearing against the bottom surface of a shallow recess 120 provided in the lower surface of end cap 85.

Means responsive to vertical downward movement of piston 99 are provided for holding spindle 23 with its extension 43 against longitudinal movement. While such means may be variously constructed, the same are shown as comprising a pair of slides, each represented generally by the numeral 121, arranged on diametrically opposite sides of spindle extension 43 and each in the form of a generally rectangular block having a substantially semicircularly recessed inner end face 122 adapted to enter groove 46 in this spindle extension whereby the upper surface 123 of the slide can be engaged by the downwardly facing shoulder 124 formed by such groove. These slides are constrained to move on the flat top surface 77 of plate 76 in a common rectilinear path by a pair of elongated guides 126 arranged on opposite sides of the pair of slides. Each slide guide 126 has a vertical wall 128 extending along the aligned sidewalls of the slides, an upper inturned flange 129 which overlies the tops of the slides, and a lower outturned attaching flange 130. Each such flange 130 is shown as having three spaced holes, each receiving a cap screw 131 which extends through each such hole and has its threaded shank screwed into an internally threaded hole 132 provided in plate 76.

Each slide 121 is arranged to be urged radially outwardly away from spindle extension 43 by a retract spring 133 shown as a helical compression spring. For this purpose, each slide is provided with a vertical through opening 134 having an outer end wall 135 against which one end of spring 133 bears. The opposite end of this spring 133 bears against a pair of upstanding dowel pins 136 severally set into vertical holes 138 provided in plate 76. The spring is also retained in operative position by a ramp member 139 in the form of a plate having a pair of downturned flanges 140 which straddle opposite sides of the spring. This plate overlies the top surface 123 of the corresponding slide and is secured thereto by a pair of cap screws 141 severally passing through holes 142 provided in this plate, the shanks of these screws being screwed into internally threaded recesses 143 provided in the slide. The inner end of this plate has an upwardly and inwardly turned flange to provide a ramp or retract cam surface 144. The inner end wall 145 of opening in each slide has its upper portion also inclined upwardly and inwardly to provide an advance cam surface 146 which is generally parallel to the other cam surface 144.

Piston 99 is shown as provided with two pairs of spaced depending arms 148 between each pair of which a cam roller 149 is arranged, this roller being freely rotatable about the horizontal axis of the shaft 150 for this roller carried by these arms. One such pair of arms and roller is provided for each slide 121 adjacent the inner portion of the opening 134 therein.

When the piston moves from its upper position shown in FIG. 2 to its lower position shown in FIG. 6, the periphery of each cam roller 149 engages advance cam surface 146 on the corresponding slide and causes radially inward movement of such slide to move the same into locking engagement with spindle extension 43. Continued downward piston movement causes each cam roller to roll out inner vertical wall surface 145 and thereby hold the slide in its locked position as shown in FIG. 6. An enlarged hole 151 is provided in plate 76 under each cam roller 149 so as to accommodate its full downward stroke as illustrated in FIG. 6. When the piston rises the cam rollers 149 will first roll along vertical surfaces 145 and then leave these surfaces. In case a retract spring 133 does not move its slide 121 away from spindle extension 43, the continued upper movement of the corresponding cam roller 149 will engage the corresponding retract cam surface 144, and force retraction of the corresponding slide away from the spindle extension.

Piston bolt 101 has a recess 152 in its lower surface providing a downwardly facing recessed surface 153 spaced from but adapted to engage the upper end face 154 of drawbar 39.

OPERATION

It is assumed that a tool holder H is locked onto spindle 23, the hooks 52 and 53 being engaged, and piston 99 is in its upper position so that opposed piston and drawbar surfaces 153 and 154 are spaced apart, all as depicted in FIG. 2. Switch 111 is open and solenoid valve 105 is deenergized. When the operator desires to change a working tool, after first stopping rotation of the spindle, he grasps tool holder H on the spindle with one hand and with his other hand closes switch 111. This energizes solenoid valve 105 to admit compressed air into actuator chamber 103 and drive piston 99 downwardly. As the piston descends its cam rollers 149 engage cam surfaces 146 first to cause slides 121 to advance toward spindle extension 43 and enter groove 46. The effect of this is to grasp extension 43 and hold it against longitudinal movement. Thereafter continued downward movement of the piston brings its surface 153 into abutting engagement with drawbar end face 154. Still further descent of the piston then compresses spring washers 51 and produces downward movement of the drawbar 39 relative to the spindle 23. Such relative movement pushes the lower ends of hook fingers 60 off cam 63 causing the spindle hook 53 to contract and unlock its connection to tool hook 52, as depicted in FIG. 6. As the slide member 58 with its fingers 60 continues to move downwardly ejector sleeve end face 71 engages tool holder end face 36 and starts to separate the tapered sections 30 and 31. The operator still grasping the holder H with one hand, and still keeping switch 111 closed with the other, removes the tool holder by lowering the same. He can then release switch 111 if he chooses or keep it closed.

It is to be noted that when piston 99 pushes down on drawbar 39 to further compress springs 51 the spindle extension 43 which supports these springs is held by slides 121 so that no forces are applied to spindle bearings 24.

With the switch 111 closed, the operator then inserts the tapered section 31 of a substitute tool holder H into spindle recess 30. The operator will rotate the tool holder to register key 38 and keyway 35 at the start of such insertion. The now contracted spindle hook 53 enters tool holder recess 54. After he has raised the substitute tool holder as high as he can, he releases switch 111 allowing the same to open and deenergize solenoid valve 105. This vents actuator chamber 103 to atmosphere and thereupon springs 118 initially assisted by springs 51 raise piston 99 until the upper end of piston bolt 101 engages the bottom of end cap recess 120. As the piston starts to rise, the first thing that happens is that spring washers 51 expand to raise drawbar 39 thereby bringing tapered sections 30 and 31 into intimate contact. These spring washers will be left loaded so that the tool holder is constantly urged upwardly into a firmly seated position on the spindle. Such engagement between tapered sections 30 and 31 limits upward movement of the drawbar. The piston, however, will continue to move upwardly after surfaces 152 and 153 begin to separate. Cam rollers 149 will roll off vertical surfaces 145 onto cam surfaces 146. As this occurs springs 133 expand to retract slides 121 from groove 46, thereby freeing spindle 23 for vertical travel during subsequent machining operations. As previously pointed out, if a slide should fail to retract under the urging of its spring 133, it will be positively retracted by interference between the corresponding cam roller 149 and retract cam surface 144.

What is claimed is:

1. In a machine tool including a spindle having a tapered recess for seating a tool holder, the improvement of a quick tool change mechanism which comprises a drawbar, holder-to-drawbar connection means for releasably connecting said drawbar to said holder responsive to longitudinal movement of said drawbar relative to said spindle, and drawbar-movement-control means for moving said drawbar relative to said spindle including bias means operatively arranged between said drawbar and spindle and urging said drawbar to move relative to said spindle in one direction to pull said holder into seated engagement in said recess and release means for moving said drawbar relative to said spindle in the opposite direction to operate said holder-to-drawing connection means to disconnect said holder from said drawbar, said release means including means for holding said spindle against longitudinal movement while moving said drawbar in said opposite direction against the urging of said bias means and being operative to cause said holding means first to engage said spindle to prevent longitudinal movement thereof and thereafter to move said drawbar relative to said spindle in said opposite direction against the urging of said bias means, said holding means including means providing an external lock recess in said spindle and a slide movable into said lock recess and having an advance cam surface, and said release means further including a piston having a cam engageable with said advance cam surface to effect such locking movement of said slide.

2. The combination according to claim 1 wherein retract spring means urge said slide away from said spindle.

3. The combination according to claim 2 wherein said slide has an opening formed with opposite walls, said advance cam surface is on one of said walls, a retract cam surface is on the other of said walls, said cam comprises a roller movable into and out of said opening between and engageable with either of said cam surfaces, said roller when moved into said opening engaging said advance cam surface and when moved out of said opening engageable with said retract cam surface in case said retract spring means failed to retract said slide.

4. The combination according to claim 3 wherein movement of said piston into said opening so as to engage said cam with said advance cam surface is operative to move said slide into said lock recess and locking engagement with said spindle, after which said piston continues to move in the same direction to engage said drawbar to move the same relative to said spindle.

5. The combination according to claim 4 wherein said slide is arranged on one side of said spindle and is movable radially with respect thereto, and said holding means further comprises a second slide structurally similar to the aforementioned slide and arranged diametrically opposite thereof on the other side of said spindle, and said piston has a second cam cooperable with said second slide in a manner the same as described for the first mentioned slide.

6. The combination according to claim 5 wherein said release means further comprises means for guiding movement of said piston.

7. The combination according to claim 6 wherein said release means further comprises return spring means for said piston.

8. The combination according to claim 7 wherein said release means further comprises a diaphragm connected centrally to said piston and having a marginal portion and an intermediate unrestricted flexible portion, actuator chamber means securing said marginal portion to provide an actuator chamber and means for introducing pressurized fluid into said chamber for moving said piston against the urging of said return spring means.

9. The combination according to claim 8 wherein said release means further comprises means for selectively controlling the introduction of said pressurized fluid into said chamber.

10. In a machine tool including a tubular spindle having an internally tapered recess for seating the externally tapered spindle-insertable end portion of a tool holder, the improvement of a quick tool change mechanism which comprises a drawbar arranged in said spindle, the end face of said insertable end portion having a hook recess the mouth of which is formed by an inturned annular lip to provide a tool hook,, holder-to-drawbar connection means for releasably connecting said drawbar to said holder responsive to longitudinal movement of said drawbar relative to said spindle and including a slide member and a plurality of circumferentially spaced fingers projecting axially from said slide member, the free end of each of said fingers being radially movable and formed to provide an external hook, all such external hooks collectively providing a spindle hook which is radially expandable and retractable, and cam means for moving said fingers radially in and out, said spindle hook when contracted being insertable through said mouth into said hook recess past said lip by axial movement of said slide member in a direction toward said end portion and when in such relative axial position being expandable into locked engagement with said lip, and drawbar-movement-control means for moving said drawbar relative to said spindle including bias means operatively arranged between said drawbar and spindle and urging said drawbar to move relative to said spindle in one direction to pull said holder into seated engagement in said recess and release means for moving said drawbar relative to said spindle in the opposite direction to operate said holder-to-drawbar connection means to disconnect said holder from said drawbar.

11. The combination according to claim 10 wherein the free ends of said fingers are radially contractile, and said cam means include cam surfaces severally on the radially inner sides of said fingers at said free ends thereof and a cam mounted on said spindle within the cluster of said fingers and engageable with said cam surfaces.

12. The combination according to claim 11 wherein said cam means further include a sleeve mounted on said spindle and radial struts severally extending in the spaces between adjacent pairs of fingers, said struts at their outer radial ends being connected to said sleeve and at their inner radial ends being connected to said cam.

13. The combination according to claim 12 wherein said struts are fewer in number than said spaces.

14. The combination according to claim 10, further comprising tool ejection means responsive to said axial movement of said slide member in said direction for ejecting said inserted holder upon disengagement of said spindle and tool hooks.

15. The combination according to claim 12, further comprising a tool ejector member slidably mounted on said sleeve and having slots receiving said struts and pushed against said end portion by said slide member when axially moved in said direction.

16. The combination according to claim 12, further comprising a guide spider on said cam adjacent said fingers and including a plurality of radial fins arranged in said spaces having guide surfaces exposed radially outwardly of said external hooks when said spindle hook is radially contracted.

17. The combination according to claim 13, further comprising a guide spider on said cam adjacent said fingers and including a plurality of radial fins arranged in said spaces having guide surfaces exposed radially outwardly of said external hooks when said spindle hook is radially contracted, said fins being the same in number as said struts and arranged in the same ones of said spaces.

* * * * *